United States Patent [19]
Berg

[11] Patent Number: 5,514,947
[45] Date of Patent: May 7, 1996

[54] PHASE LEAD COMPENSATION CIRCUIT FOR AN INTEGRATED SWITCHING REGULATOR

[75] Inventor: Steven K. Berg, San Jose, Calif.

[73] Assignee: National Semiconductor Corporation, Santa Clara, Calif.

[21] Appl. No.: 384,288

[22] Filed: Jan. 31, 1995

[51] Int. Cl.[6] .................................................. G05F 1/40
[52] U.S. Cl. ................................. 323/282; 323/285
[58] Field of Search .............................. 323/222, 282, 323/284, 285, 286, 287, 288

[56] References Cited

U.S. PATENT DOCUMENTS

| | | | |
|---|---|---|---|
| 5,055,767 | 10/1991 | Nelson | 323/285 |
| 5,192,906 | 3/1993 | Nathan | 323/284 |
| 5,382,918 | 1/1995 | Yamatake | 330/260 |
| 5,399,958 | 3/1995 | Iyoda | 323/282 |
| 5,408,173 | 4/1995 | Knapp | 323/285 |
| 5,422,562 | 6/1995 | Mammano et al. | 323/282 |
| 5,425,040 | 6/1995 | Krawczak | 323/282 |

*Primary Examiner*—Matthew V. Nguyen
*Attorney, Agent, or Firm*—Skjerven, Morrill, MacPherson, Franklin & Friel; Brian D. Ogonowsky

[57] ABSTRACT

The invention allows a phase lead compensation circuit to be integrated on the same chip as a switching regulator. The invention provides additional phase to the loop gain of the monolithic switching regulator. The additional phase is required near the unity gain frequency of the loop gain and is not continued indefinitely. The desired phase lead compensation function can be accomplished through the use of a transconductance amplifier driving a frequency-dependent load. The transconductance amplifier converts a differential input voltage signal into a single-ended output current. This output current flows through the frequency-dependent load.

14 Claims, 8 Drawing Sheets

PHASE LEAD COMPENSATION CIRCUIT FOR AN INTEGRATED SWITCHING REGULATOR

FIELD OF INVENTION

This invention relates to a monolithic integrated switching regulator (using an on-chip or off-chip output filter) having an on-chip phase lead compensation circuit in the switching regulator feedback loop.

BACKGROUND OF THE INVENTION

Switching regulators use negative feedback in their control loops to reduce the effects of parameter variations on output voltage regulation. The presence of feedback in the control loop, however, introduces the possibilities of system instability. Such instability may be initiated by a fluctuation in the load impedance. As with virtually any feedback system, switching regulator control loops must satisfy the Nyquist criterion for insuring closed-loop stability.

The loop gain of a switching regulator (or any feedback system) is a complex quantity that can be represented by its magnitude and phase. The frequency at which the magnitude of the loop gain is one (0dB) is defined as the crossover frequency $f_c$, and the difference between the phase angle of the loop gain at the crossover frequency and −180 degrees is defined as the phase margin, PM, of the system. The Nyquist criterion states that if the phase margin of the loop gain is less than zero degrees at the crossover frequency, the system will be unstable. How close the phase margin is to zero degrees at the crossover frequency is a measure of the relative stability of the system.

A conventional switching regulator uses an inductor-capacitor (LC) network which filters a pulse-width-modulated (PWM) rectangular switching waveform to produce a relatively constant DC output voltage. The LC filter, however, introduces a large phase shift (commonly called a phase lag) into the control loop of the switching regulator. If this phase lag is not corrected, poor transient response and loop instability can result for the reasons stated above. In most cases, additional compensation circuitry must be added to a switching regulator control loop to compensate for the phase lag introduced by the LC output filter.

Figure 1:
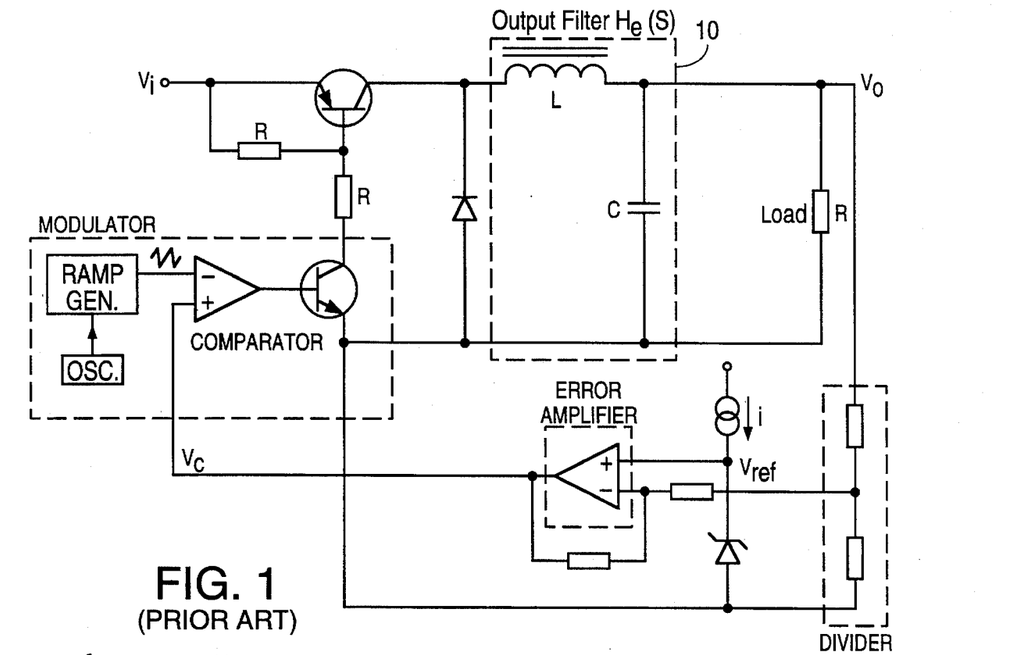
FIG. 1 illustrates a conventional step-down switching regulator which is known in the prior art.
Figure 2:
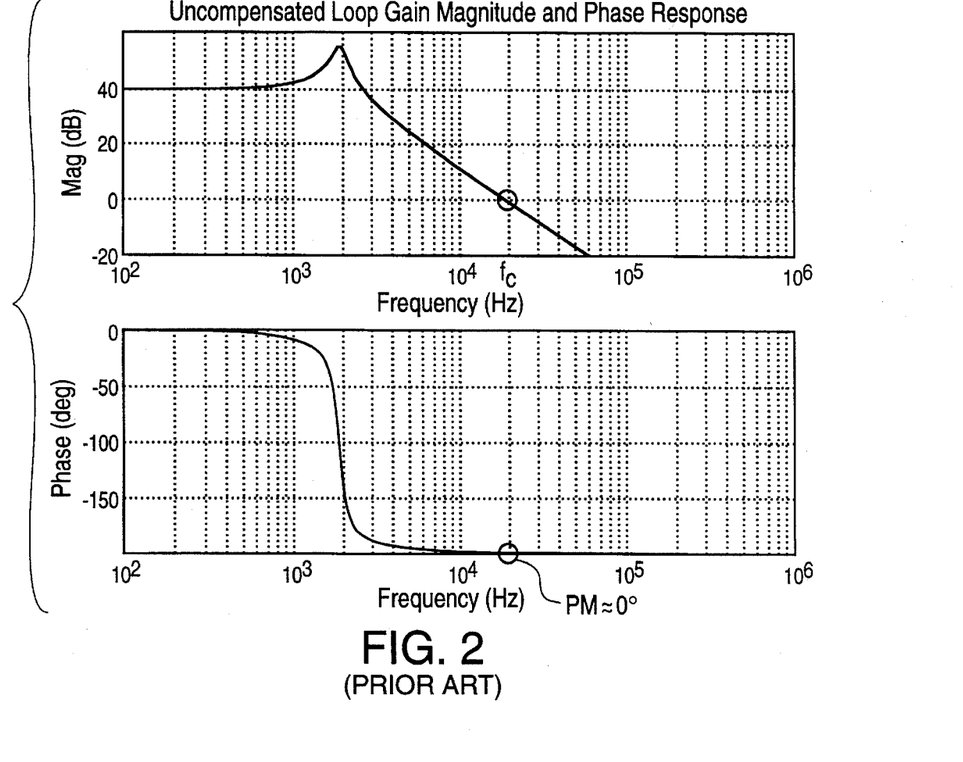
FIG. 2 is a magnitude plot and a phase plot of a loop gain transfer function which characterizes the behavior of the switching regulator shown in FIG. 1.

For example, in a conventional step-down switching regulator shown in FIG. 1, an LC output filter 10, contributes two poles to the loop gain response. These two poles cause a decrease in the loop gain magnitude and a large phase lag in the forward part of the feedback loop at signal frequencies greater than the resonance frequency of the LC network. Control circuitry within the switching regulator may also contribute high frequency poles. The loop gain magnitude and phase angle plots are shown in FIG. 2.

Because of the gain magnitude decrease and phase lag, the phase margin of the system of FIG. 1 approaches zero or is negative near the unity gain frequency ($f_c$) of the loop gain. Inadequate or negative phase margin causes oscillatory or unstable closed-loop behavior in a manner analogous to that of improperly compensated operational amplifier circuits. Thus, it is desirable to include circuitry in a switching regulator which compensates for the phase lag of the LC output filter.

Figure 3:
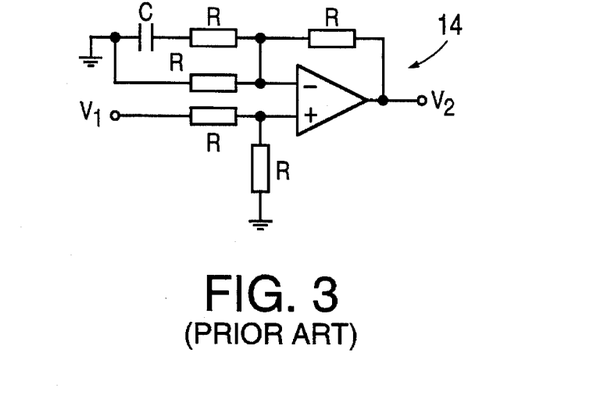
FIG. 3 illustrates a conventional phase-lead network used to stabilize a switching regulator in the prior art.
Figure 4:
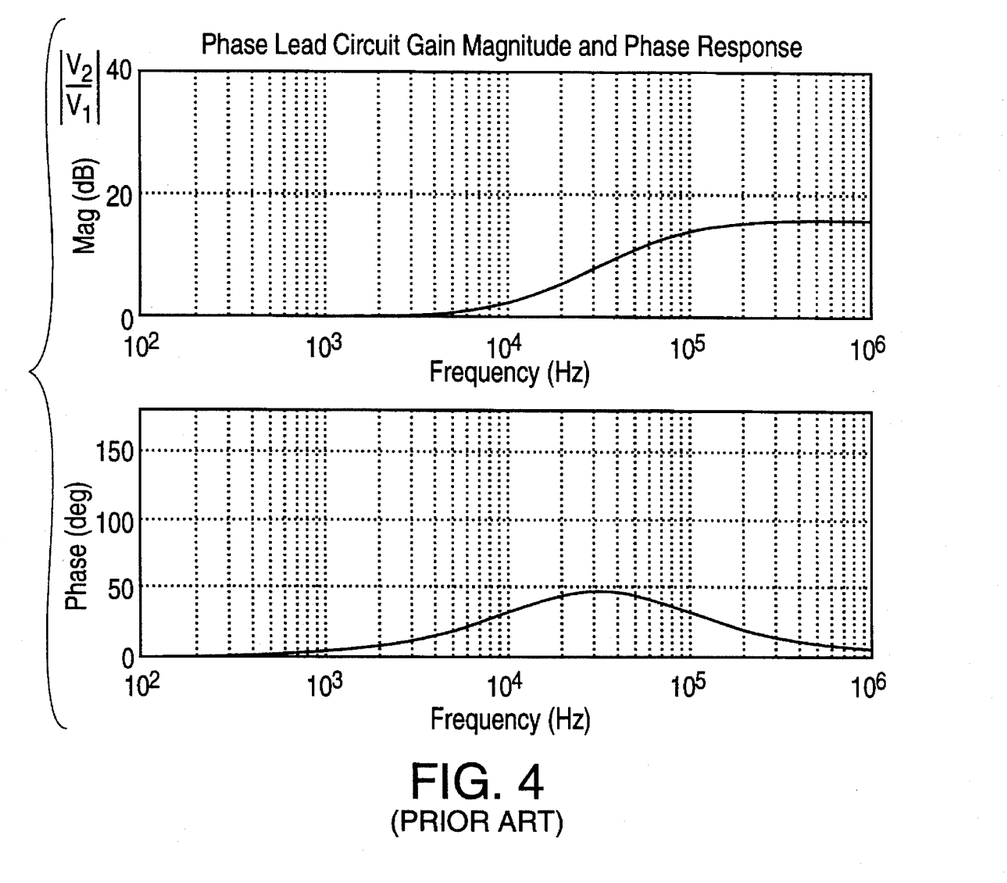
FIG. 4 is a representative magnitude plot and a phase plot of the transfer function of a phase lead network used to stabilize the switching regulator shown in FIG. 1.

Prior art switching regulator designs have utilized phase lead circuits, such as the lead circuit 14 shown in FIG. 3, to compensate the control loop phase response. An illustrative gain magnitude and phase response of the lead circuit 14 is shown in FIG. 4. When this circuit 14 is included in the feedback loop of a switching regulator, it increases the phase margin of the regulator and thus increases its stability.

Figure 5:
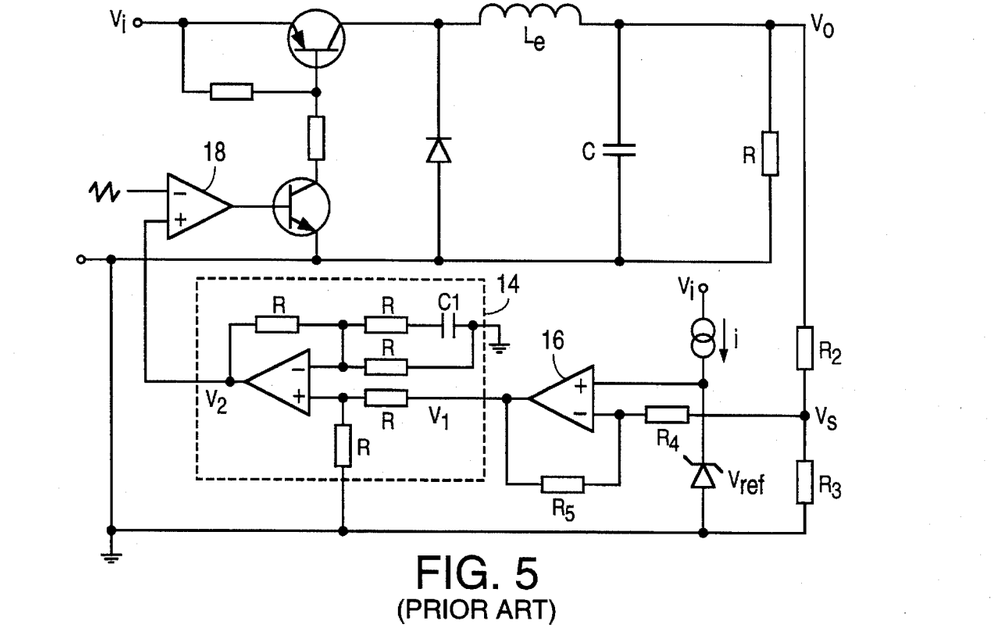
FIG. 5 illustrates the switching regulator of FIG. 1 utilizing the phase lead network of FIG. 3.
Figure 6:
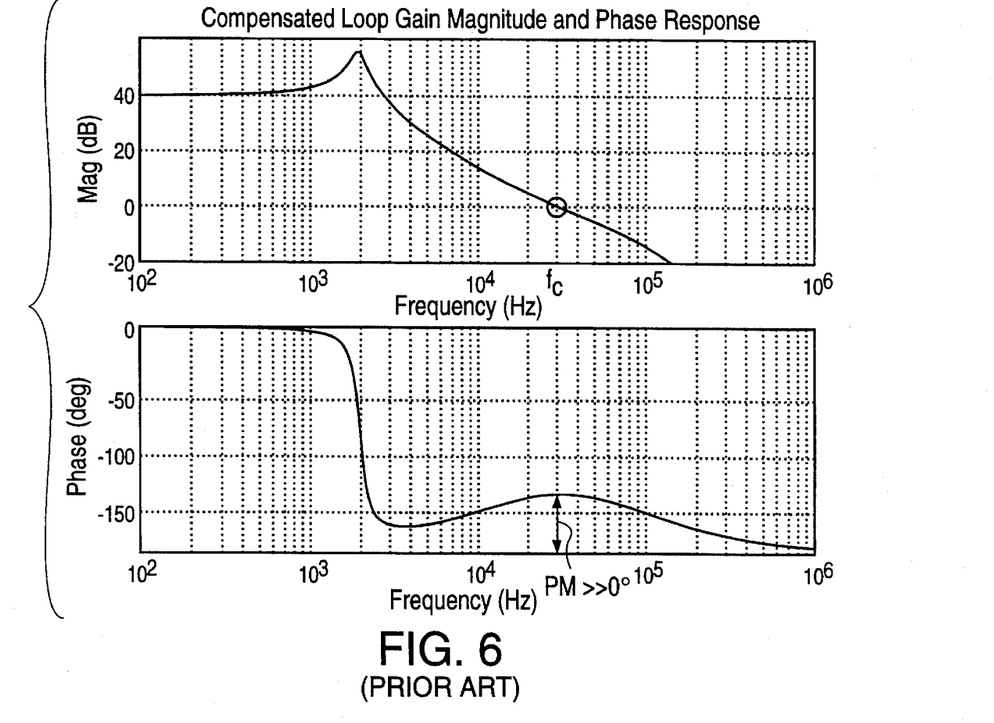
FIG. 6 is a magnitude plot and a phase plot of the loop gain transfer function for the regulator of FIG. 5.

FIG. 5 shows a phase-compensated step-down switching regulator. It is identical to the switching regulator shown in FIG. 1 except that the phase lead circuit 14 of FIG. 3 has been included in the feedback loop between error amplifier 16 and comparator 18. The loop gain magnitude and phase response plots for the phase-compensated step-down switching regulator are shown in FIG. 6. The phase margin of the compensated regulator is much greater than that of the uncompensated regulator and is therefore much more stable.

Because the capacitor C1 of FIG. 5 must be very large in order to provide phase compensation at the desired frequencies, and large capacitors cannot be economically integrated on an integrated circuit chip, the phase-lead compensation circuit 14 of FIG. 3 has been limited to discrete designs. U.S. Pat. No. 5,382,918 to Mineo Yamatake, assigned to the same assignee as the present application and incorporated herein by reference, describes a capacitance multiplying circuit which may be integrated on a chip; however, that circuit is not suitable for a phase-lead compensation network having characteristics similar to those shown in FIG. 4.

Thus, it is desirable to completely integrate a phase lead compensation circuit within the feedback loop of a monolithic switching regulator. Such a compensation circuit would be required to perform the phase lead compensation function without the use of relatively large capacitors or inductors.

SUMMARY OF THE INVENTION

The invention allows a phase lead compensation circuit to be integrated on the same chip as a switching regulator. The invention provides additional phase to the loop gain of the monolithic switching regulator. The additional phase is required near the unity gain frequency of the loop gain and is not continued indefinitely.

The desired phase lead compensation function can be accomplished through the use of a transconductance amplifier driving a frequency-dependent load. The transconductance amplifier converts a differential input voltage signal into a single-ended output current. This output current flows through the frequency-dependent load. The voltage gain ($A_v$) of this phase lead compensation stage is determined by the transconductance (gm) of the amplifier and the input impedance ($Z_{in}$) of the frequency-dependent load:

$$A_v = gm \times Z_{in} \qquad \text{(eq. 1)}$$

In the preferred embodiment, the frequency-dependent load makes use of a severely band-limited op amp and the principles of shunt-shunt feedback. At low frequencies, the impedance at the summing node of the op amp is reduced by the large loop gain of the op amp and is a virtual ac signal ground. As signal frequencies increase, however, the op amp loop gain decreases and the impedance at the summing node increases. This increase in impedance mimics the behavior of a large inductor. Finally, resistors connected to terminals of the op amp limit the magnitude of the summing node impedance at very high frequencies. The resulting gain magnitude and phase response plots for the phase lead compensation circuit replicates those of discrete phase lead compensation circuits previously described.

DETAILED DESCRIPTION OF THE PREFERRED EMBODIMENTS

Figure 7:
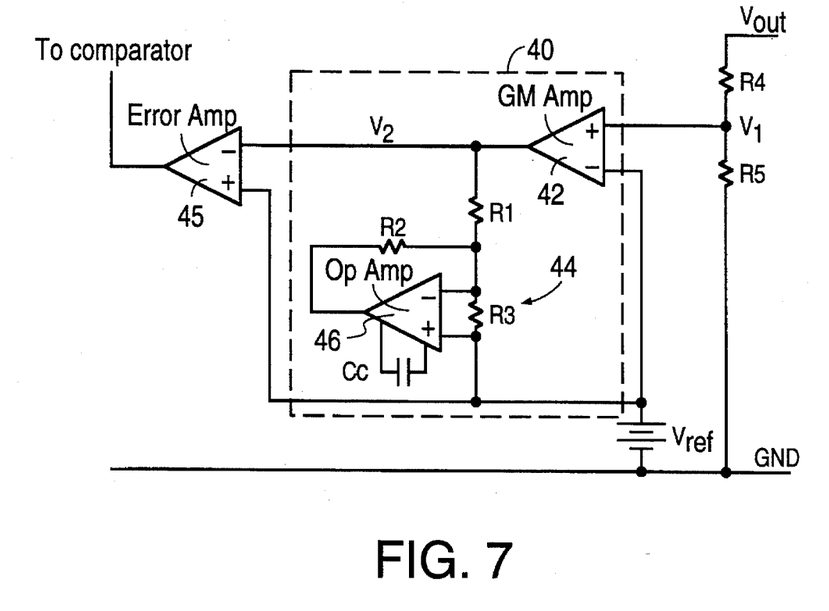
FIG. 7 is a schematic diagram of a monolithic phase lead compensation circuit having a frequency-dependent input impedance in accordance with an embodiment of the present invention.

FIG. 7 is a schematic diagram illustrating a preferred embodiment phase lead compensation circuit 40 which can be implemented on the same chip as a switching regulator. The phase lead compensation circuit 40 is formed by a transconductance amplifier 42 and a frequency-dependent load 44. The frequency-dependent load 44 consists of resistors R1, R2 and R3 op amp 46, and capacitor $C_c$. Transconductance amplifier 42 converts a differential input voltage signal into a single-ended output current.

The inputs into transconductance amplifier 42 are a voltage-divided DC output voltage $V_{out}$ of the regulator and a reference voltage $V_{ref}$. $V_{ref}$ is preferably a band gap reference voltage. Substantially all of the transconductance amplifier 42 output current flows through the frequency-dependent load 44, assuming the error amplifier 45 input impedance is very high.

The voltage gain $A_v$ of the phase lead compensation circuit 40 is determined by the transconductance (gm) of amplifier 42 and the input impedance $Z_{in}$ of the frequency-dependent load 44:

$$A_v = gm \times Z_{in}. \quad \text{(eq. 2)}$$

The input impedance of the frequency-dependent load 44 is given by:

$$Zin(s) = R1 + \frac{R2R3}{R2 + [1+A(s)]R3}, \quad \text{(eq. 3)}$$

where A(s) is the loop gain of the op amp 46 given by:

$$A(s) = \frac{A_0}{1+j\frac{f}{f_p}}, \quad \text{(eq. 4)}$$

where $A_0$ is the DC gain of the op amp 46, and $f_p$ is the frequency at which the op amp 46 gain is 3dB less than its DC value.

Figure 8:
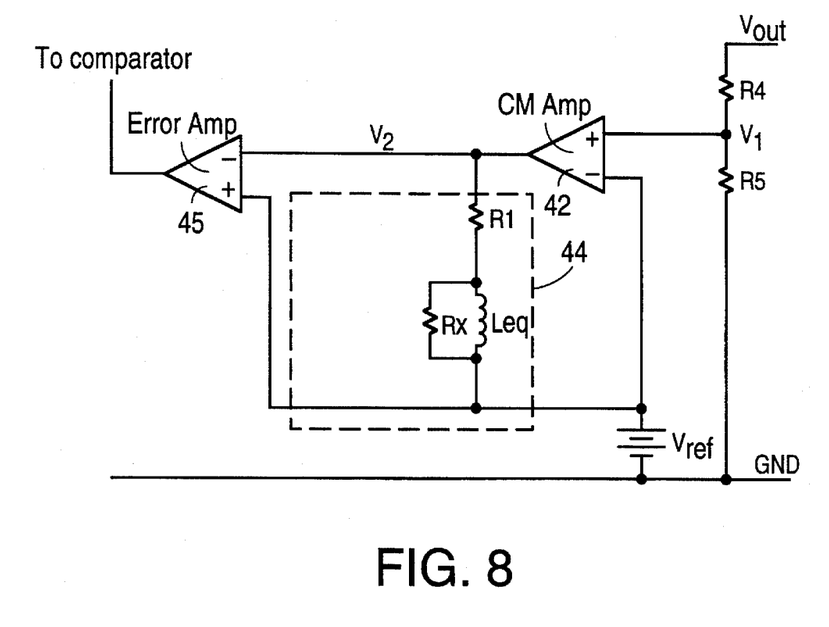
FIG. 8 shows the circuit of FIG. 7 as an equivalent circuit.
Figure 9:
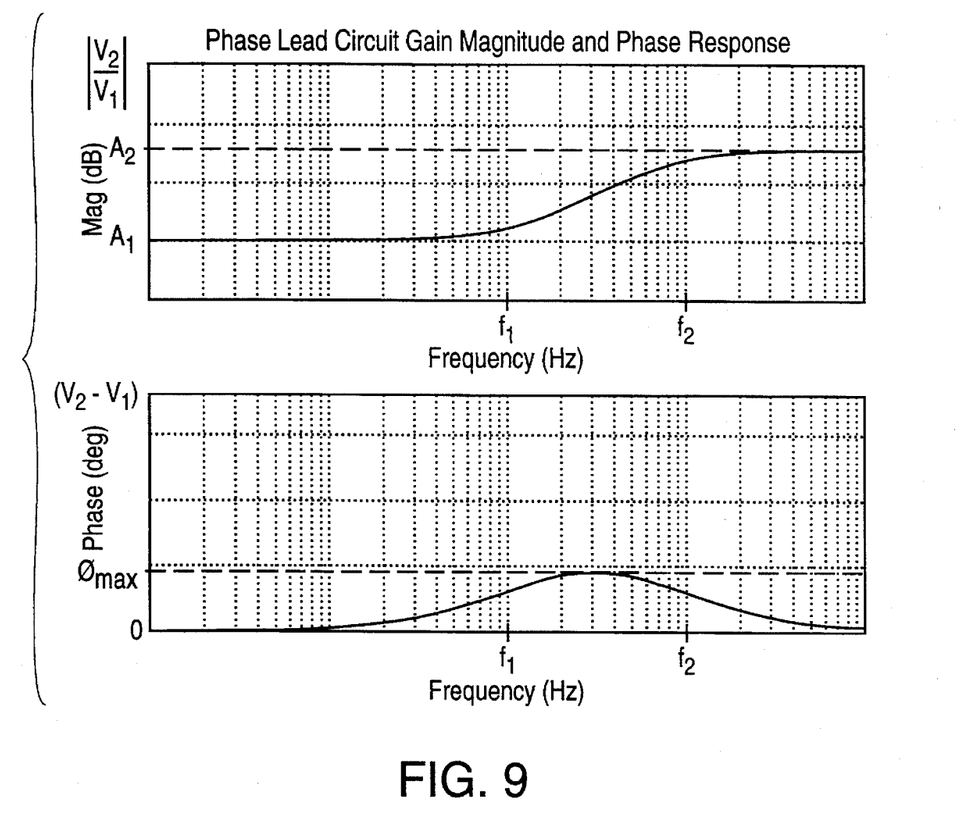
FIG. 9 is a magnitude plot and a phase plot of the transfer function of the phase lead compensation circuit of FIG. 7.

The input impedance of the frequency-dependent load 44 is approximately equal to R1 at low frequencies where the loop gain A(s) of op amp 46 is very large. At higher frequencies, as the loop gain of op amp 46 decreases, the input impedance of the frequency-dependent load 44 begins to increase. This increase in input impedance emulates the behavior of a large equivalent inductance ($L_{eq}$), as shown in FIG. 8, and causes an increase in the gain and phase lead. Finally, at very high frequencies where A(s) is much less than unity, the input impedance of the frequency-dependent load 44 is determined by the parallel combination of R2 and R3 in series with R1. This parallel combination is represented by Rx in FIG. 8. The magnitude and phase response of the phase lead compensation circuit 40 are shown in FIG. 9. Equations pertaining to FIGS. 7–9 are given below.

The impedance seen looking into the inverting input of the op amp 46 is:

$$Zin(s) = \frac{R2R3}{R2+[1+A(s)]R3}. \quad \text{(eq. 5)}$$

If R2=R3=R then, $$Zin(s) = \frac{R}{[2+A(s)]}. \quad \text{(eq. 6)}$$

Evaluating $Z_{in}(j2\pi f)$ at frequency $f_1$ yields:

$$Zin(j2\pi f)|_{f=f_1} = \frac{R}{[2+A(j2\pi f_1)]}. \quad \text{(eq. 7)}$$

The magnitude of $Z_{in}$ at frequency $f_1$ is equal to R1, $$|Zin(j2\pi f_1)|_{f=f_1} = \frac{R}{[2+|A(j2\pi f_1)|]} = R1 \quad \text{(eq. 8)}$$

so this equation can be rearranged to determine the gain of the op amp 46 at $f_1$:

$$|A(j2\pi f_1)| = \left(\frac{R}{R1}\right) - 2. \quad \text{(eq. 9)}$$

Since the gain bandwidth product of an amplifier is constant, the frequency $f_1$ can be determined from the unity gain frequency $f_{unity}$ of the op amp 46, and the gain of the op amp 46 at frequency $f_1$:

$$f_1 = \frac{funity}{|A(j2\pi f_1)|}. \quad \text{(eq. 10)}$$

Figure 10:
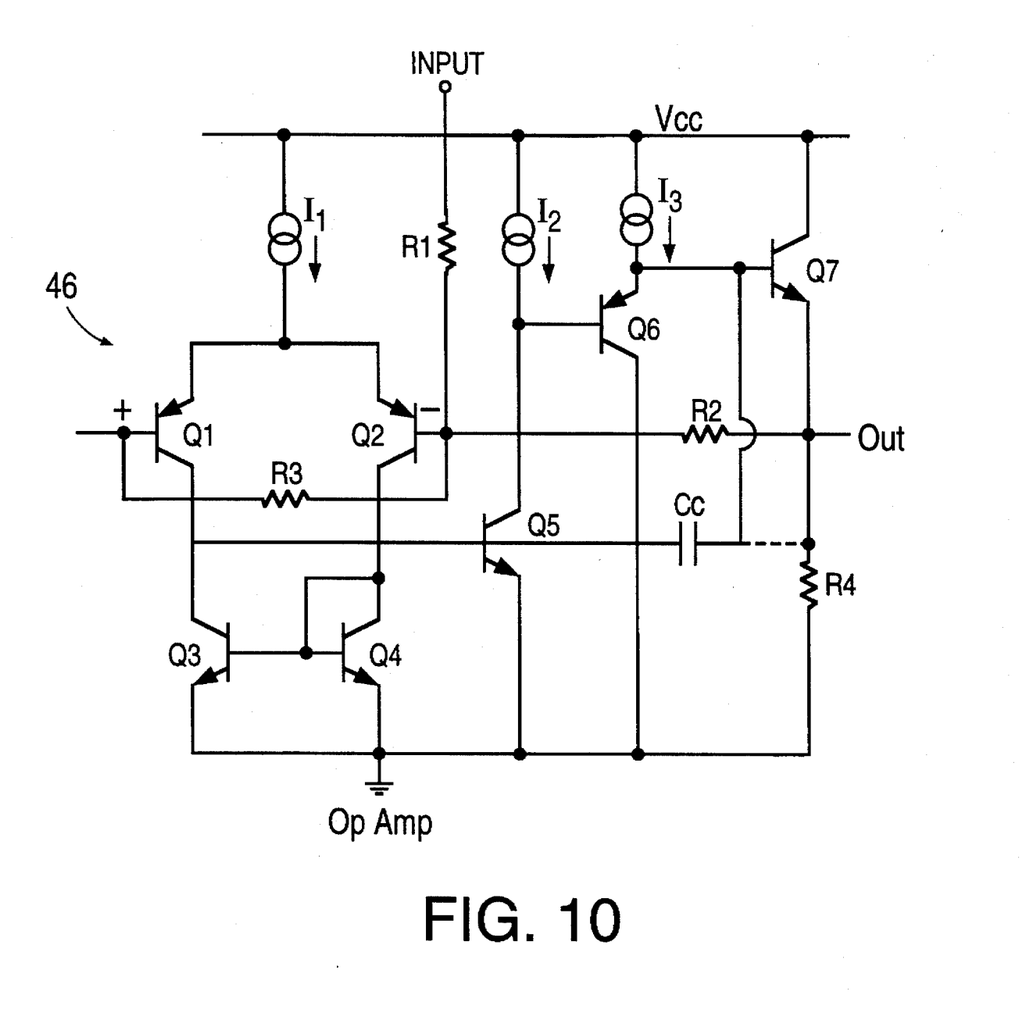
FIGS. 10 and 11 are schematic diagrams illustrating the construction of the operational amplifier in FIG. 7.

Thus, $f_1$ can be expressed as:

$$f_1 = \frac{funity}{\left(\frac{R2}{R1} - 2\right)} \quad \text{(eq. 11)}$$

where $f_{unity}$=the unity gain frequency of the op amp 46. The unity gain frequency is determined by the op amp's PNP input stage transconductance (gm) and compensation capacitor $C_c$ shown in FIGS. 7 and 10:

$$funity = \frac{gm}{2\pi Cc}. \quad \text{(eq. 12)}$$

The phase compensation ends at the unity gain frequency of the op amp 46 when the op amp 46 can no longer influence the input impedance of the frequency-dependent load:

$$f_2 = funity = \frac{gm}{2\pi Cc}. \quad \text{(eq. 13)}$$

In one embodiment, $f_1$ equals approximately 10 KHz and $f_2$ equals approximately 100 KHz. The gain ($A_1$) of the phase lead compensation circuit 40 below $f_1$ is approximately:

$$A_1 = 20 \log(GM_1 \times R_1), \quad \text{(eq. 14)}$$

where GM1 is the transconductance of the transconductance amplifier 42. The gain ($A_2$) above $f_2$ is approximately:

$$A_2 = 20 \log(GM_1 \times R_{EQ}), \quad \text{(eq. 15)}$$

where:

$$R_{EQ} = R_1 + (R_2 | R_3). \quad \text{(eq. 16)}$$

The maximum amount of phase added by the phase lead compensation circuit 40 is:

$$\phi_{max} = \tan^{-1}\frac{1}{(\sqrt{a})} - \tan^{-1}\sqrt{a} \quad \text{(eq. 17)}$$

where $$a = \frac{f_1}{f_2}. \quad \text{(eq. 18)}$$

In one embodiment, $\Phi_{max}$ is approximately 50°.

FIG. 10 is a simplified schematic diagram of the band-limited op amp 46 and its connections to R1, R2, R3, and $C_c$ used in the preferred embodiment, where the circuit of FIG. 10 is incorporated on the same chip as a switching regulator.

Two PNP transistors Q1 and Q2 form a differential input stage for the op amp 46. The bases of the pair of PNP transistors Q1 and Q2 are noninverting and inverting input terminals, respectively, of the op amp 46. The emitter terminals of PNP transistors Q1 and Q2 are connected together to a current source $I_1$.

A pair of NPN transistors Q3 and Q4 form a current mirror load for the differential input stage. The emitter terminals of NPN transistors Q3 and Q4 are connected to a reference (ground) voltage source. The base terminal of NPN transistor Q3 is connected to the base terminal of NPN transistor Q4. The collector terminal of NPN transistor Q3 is connected to the collector terminal of PNP transistor Q1. The collector and base terminals of NPN transistor Q4 are connected to the collector terminal of PNP transistor Q2. A single-ended output terminal of the differential input stage at the collector of NPN transistor Q3 is connected to the base of a common emitter amplifier transistor Q5 and to a frequency compensation capacitor $C_c$. Transistor Q5 is an NPN transistor having a collector connected to a current source $I_2$ and an emitter connected to ground.

The collector of transistor Q5 is coupled, via emitter follower transistor Q6, to the base of an emitter follower output transistor Q7. Transistor Q6 is a PNP transistor having an emitter connected to a current source $I_3$ and to the base of transistor Q7, a collector connected to ground, and a base connected to the collector of transistor Q5.

The output transistor Q7 is an NPN transistor having a collector terminal connected to a power supply terminal VCC. An emitter terminal of the output transistor Q7 forms an output terminal of op amp 46 which is fed back to the inverting input terminal of op amp 46 through resistor R2 to form a feedback loop. A small frequency compensation capacitor $C_c$ is connected between the base of transistor Q5 and the base of output transistor Q7. In another embodiment, capacitor $C_c$ is connected to the emitter of output transistor Q7. Capacitor $C_c$ supplies unity gain stability for op amp 46. A typical capacitance of capacitor $C_c$ is approximately 20 pf, which can easily be formed on an integrated circuit using well known techniques. For example, capacitor $C_c$ can be formed having a diffused lower plate, an oxide insulator, and a polysilicon or metal upper plate.

Resistor R4 is the emitter load for output transistor Q7.

Resistor R1 is connected between the output of transconductance amplifier 42 in FIG. 7 and the base of input transistor Q2. Resistor R3 is connected across the bases of input transistors Q1 and Q2. In one embodiment, R1=2K ohms, R2=R3=R4=20K ohms.

In another embodiment, resistor R3 is deleted while still achieving the general transfer function characteristics shown in FIG. 9.

Figure 11:
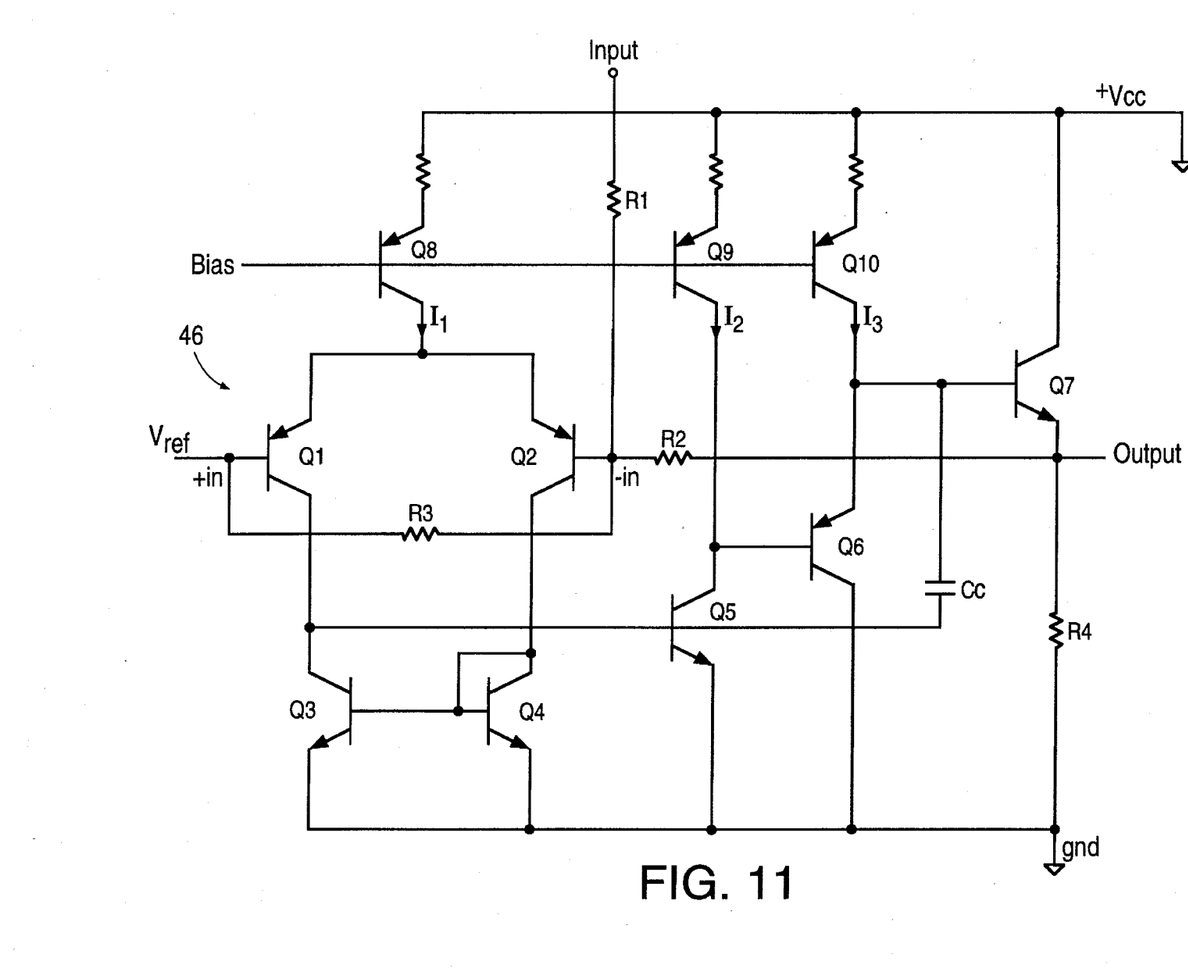

The current sources $I_1$, $I_2$ and $I_3$ are constructed in a conventional manner. FIG. 11 shows a particular embodiment of current sources $I_1$, $I_2$, and $I_3$ using transistors Q8, Q9, and Q10. $I_1$ and $I_2$ are approximately 1 μA, while $I_3$ is approximately 10 μA, in one embodiment.

Figure 12:
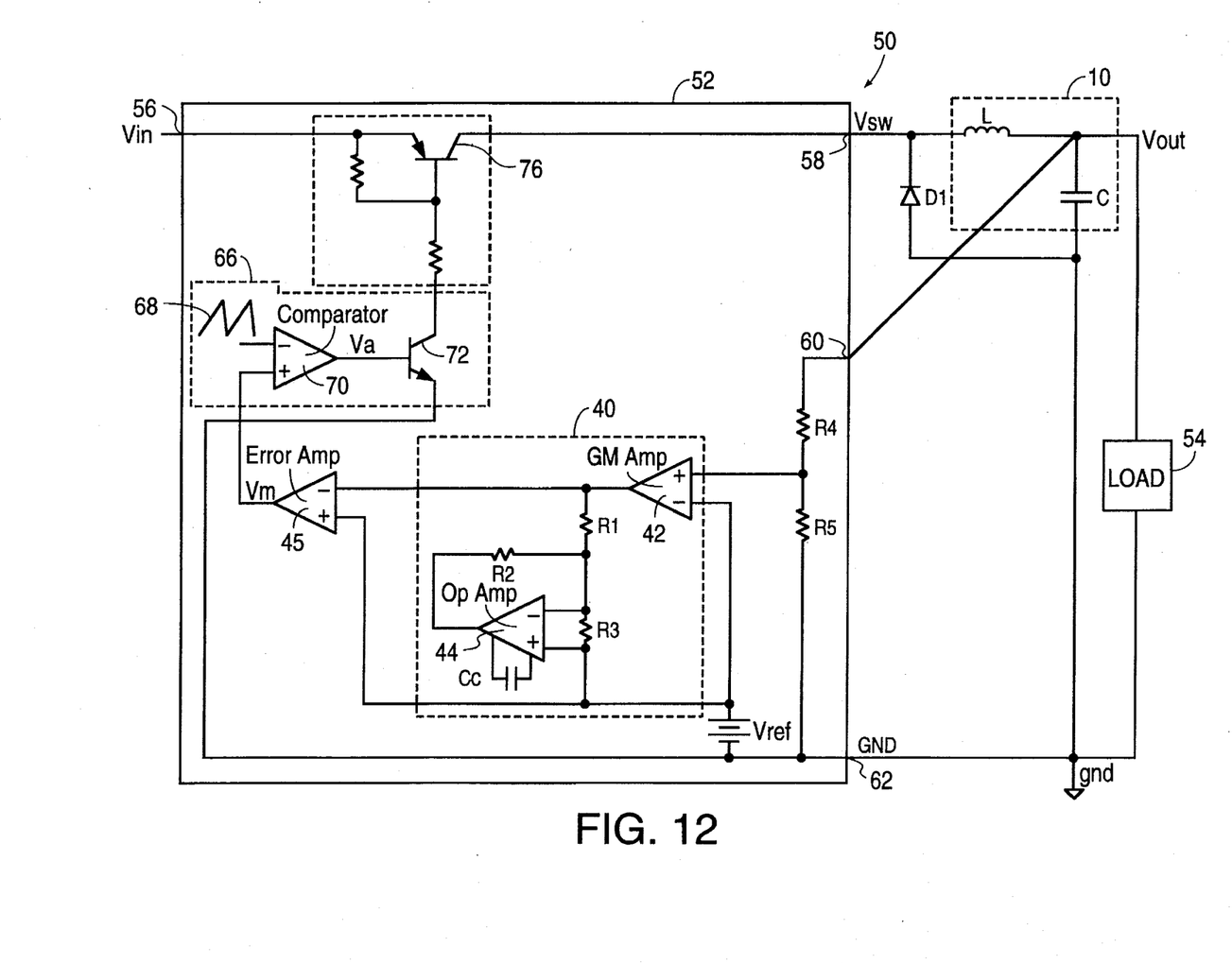
FIG. 12 is a schematic diagram of a switching regulator in accordance with an embodiment of the present invention which includes, on-chip, a circuit for phase lead compensating the feedback loop of the switching regulator.

FIG. 12 is a schematic block diagram of a switching regulator 50 which includes a monolithic integrated circuit portion 52 and various discrete components including an output diode D1, an LC output filter 10, and a load 54. The regulator 50 circuitry is conventional except for the on-chip phase lead compensation circuit 40, previously described. The resulting loop gain transfer function has a magnitude and phase similar to that shown in FIG. 6.

The block diagram of FIG. 12 is simplified to better illustrate the invention and may also include additional terminals and circuitry to meet the user's needs.

In one embodiment, the integrated circuit portion 52 has four terminals: an input voltage terminal 56, a switch output terminal 58, a feedback terminal 60, and a ground terminal 62. It would be understood that certain on-chip components may be moved off the chip for added flexibility. The input voltage terminal 56 is connected to an unregulated DC input voltage $V_{in}$. The switch output terminal 58 supplies a rectangular waveform to the inductor L. The feedback terminal 60 receives a regulated DC feedback voltage. The voltage at the feedback terminal 60 is divided by the series resistors R4 and R5. The feedback loop of the regulator 50 tries to regulate the DC output voltage so that the divided voltage at the non-inverting input of transconductance amplifier 42 equals $V_{ref}$.

Modulator 66 includes a waveform generator circuit (not shown) of a type which is typically found in switching regulators. The waveform generator circuit includes an oscillating ramp generator for generating a sawtooth waveform 68. In one embodiment, the frequency of waveform 68 is 300 KHz. Modulator 66 also includes a comparator 70 having an output connected to a control terminal of drive transistor 72. The inverting input of comparator 70 is coupled to the sawtooth waveform 68, and the non-inverting terminal of comparator 70 is connected to the output of error amplifier 45. The non-inverting input into error amplifier 45 is connected to a reference voltage $V_{ref}$, while the inverting terminal of error amplifier 45 is connected to the output of the phase lead compensation circuit 40. Error amplifier 45 is used as a level shifter, since the output of phase lead compensation circuit 40 will be equal to $V_{ref}$ when balanced.

The error voltage from error amplifier 45 is applied as a threshold signal to comparator 70 to control switching transistor 76 via drive transistor 72. In this configuration, comparator 70 in conjunction with switching transistor 76 acts as a pulse width modulator. The duty cycle of the rectangular waveform at output terminal 58 is adjusted to achieve the desired regulated output voltage $V_{out}$ of the regulator 50. When the divided output voltage $V_{out}$ exceeds the reference voltage $V_{ref}$, the output voltage of phase lead compensation circuit 40 will be above $V_{ref}$. This will cause the error signal to comparator 70 to be relatively low. When this low threshold signal is compared to the sawtooth waveform 68, the comparator 70 will output a low voltage for a relatively long duration during the waveform period. This low voltage will turn the NPN transistor 72 off to thus turn the switching transistor 76 off and reduce the duty cycle of the rectangular waveform at output terminal 58. This will thus lower the regulator $V_{out}$ voltage.

If the divided $V_{out}$ voltage is below $V_{ref}$, then the duty cycle of the rectangular waveform at output terminal 58 will increase, thus raising $V_{out}$.

When the rectangular waveform at output terminal 58 is a high voltage, inductor L filters this waveform and stores part of its energy. The DC component is passed to the load while the AC component charges the capacitor C, thus raising the output voltage $V_{out}$ an incremental amount, depending upon the duty cycle of the rectangular waveform. When transistor 76 is then turned off, diode D1 turns on, and the energy stored in inductor L charges capacitor C and provides current to the load.

The phase lead compensation circuit 40 may also be utilized in the feedback loops of other regulator designs where appropriate.

Thus, a phase lead compensation circuit which can be integrated on the same chip as a switching regulator has been shown and described. It will be apparent to those skilled in the art that portions of the on-chip circuitry shown in FIG. 12 may be placed off the chip. Such candidates for discrete components may include the power switching transistor 76 and the voltage divider consisting of resistors R4 and R5.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A switching regulator circuit comprising:

an output filter;

a switching circuit supplying a modulated waveform to said output filter, at least a portion of said switching circuit being formed as an integrated circuit; and a phase lead compensation circuit connected between an output of said output filter and an input to said switching circuit, said phase lead compensation circuit being formed on the same integrated circuit as said portion of said switching circuit, said phase lead compensation circuit comprising:

a transconductance amplifier having a first input terminal coupled to receive a voltage corresponding to a voltage at said output of said output filter, having a second input terminal coupled to a reference voltage source, and having an output terminal; and a frequency-dependent impedance, coupled to said output terminal of said transconductance amplifier, whose impedance varies as the frequency of a current output from said transconductance amplifier varies.

2. The regulator circuit of claim 1 wherein the phase lead compensation circuit supplies an increasing phase lead compensation as the voltage gain of the phase lead compensation circuit initially increases at a first frequency and supplies a decreasing phase lead compensation as said voltage gain tapers off at a second frequency higher than said first frequency.

3. The regulator circuit of claim 1 wherein said frequency-dependent impedance presents a fixed first resistance at frequencies below a first frequency, approximately emulates the behavior of an inductor in series with said fixed first resistance between said first frequency and an increased second frequency, and presents a fixed second resistance at frequencies greater than said second frequency.

4. The regulator circuit of claim 3 wherein said frequency-dependent impedance comprises a bandwidth limited operational amplifier having one input connected to said output terminal of said transconductance amplifier through a first resistor.

5. The regulator circuit of claim 3 wherein the frequency-dependent impedance comprises:

an operational amplifier having an inverting input terminal coupled to said output terminal of said transconductance amplifier through a first resistance, and a noninverting input terminal coupled to said reference voltage source;

a second resistance coupled between an output terminal of said operational amplifier and said inverting input terminal of said operational amplifier; and a frequency compensation capacitor connected between an input stage of operational amplifier and an output stage of said operational amplifier.

6. The regulator circuit of claim 5 further comprising a third resistance connected between said inverting input terminal and said non-inverting input terminal of said operational amplifier.

7. The regulator circuit of claim 5 wherein said frequency compensation capacitor is wholly formed within said integrated circuit.

8. The regulator circuit of claim 7 wherein said capacitor comprises a diffused lower plate, an insulator, and a conductive material overlying said insulator as an upper plate of said capacitor.

9. The regulator circuit of claim 1 further comprising an error amplifier having a first input terminal connected to said output terminal of said transconductance amplifier, having a second input terminal connected to a reference voltage, and having an output terminal connected to said switching circuit.

10. The regulator circuit of claim 9 wherein said switching circuit comprises a rectangular waveform generator whose duty cycle is related to an amplitude of an output of said error amplifier, said waveform generator being connected to a control terminal of a switch for periodically connecting said output filter to a power supply voltage.

11. The regulator circuit of claim 1 wherein said output filter comprises an inductor and capacitor network.

12. The regulator circuit of claim 1 wherein said first input terminal of said transconductance amplifier is connected to a voltage divider which divides said voltage at said output of said output filter.

13. The regulator circuit of claim 1 wherein said first input terminal of said transconductance amplifier is a noninverting input terminal, and said second input terminal of said transconductance amplifier is an inverting input terminal.

14. The regulator circuit of claim 1 wherein said output filter causes a phase lag in a feedback loop of said regulator circuit, and said phase lead compensation circuit at least partially compensates for said phase lag in said feedback loop.

* * * * *